US011462207B1

(12) United States Patent
Tao et al.

(10) Patent No.: US 11,462,207 B1
(45) Date of Patent: Oct. 4, 2022

(54) METHOD AND APPARATUS FOR EDITING AUDIO, ELECTRONIC DEVICE AND STORAGE MEDIUM

(71) Applicant: INSTITUTE OF AUTOMATION, CHINESE ACADEMY OF SCIENCES, Beijing (CN)

(72) Inventors: Jianhua Tao, Beijing (CN); Tao Wang, Beijing (CN); Jiangyan Yi, Beijing (CN); Ruibo Fu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/737,666

(22) Filed: May 5, 2022

(30) Foreign Application Priority Data

Nov. 3, 2021 (CN) .......................... 202111292710.2

(51) Int. Cl.
*G10L 13/08* (2013.01)
*G10L 13/033* (2013.01)
*G10L 13/047* (2013.01)
*G06F 40/166* (2020.01)
*G06N 3/08* (2006.01)
*G10L 25/03* (2013.01)

(52) U.S. Cl.
CPC ............ *G10L 13/08* (2013.01); *G06F 40/166* (2020.01); *G06N 3/08* (2013.01); *G10L 13/033* (2013.01); *G10L 13/047* (2013.01); *G10L 25/03* (2013.01)

(58) Field of Classification Search
None
See application file for complete search history.

(56) References Cited

U.S. PATENT DOCUMENTS

| 11,245,950 | B1* | 2/2022 | Mahar ..................... G10L 15/26 |
| 2011/0282650 | A1 | 11/2011 | Jennings et al. |
| 2017/0352361 | A1* | 12/2017 | Thörn ................... G06F 40/279 |

FOREIGN PATENT DOCUMENTS

| CN | 1748246 A | 3/2006 |
| CN | 105741830 A | 7/2016 |

(Continued)

OTHER PUBLICATIONS

First Office Action issued in counterpart Chinese Patent Application No. 202111292710.2, dated Dec. 15, 2021.

(Continued)

*Primary Examiner* — Richa Mishra
(74) *Attorney, Agent, or Firm* — Westbridge IP LLC

(57) ABSTRACT

Disclosed are a method and an apparatus for editing audio, an electronic device and a storage medium. The method includes: acquiring a modified text obtained by modifying a known original text of an audio to be edited according to a known text for modification; predicting a duration of an audio corresponding to the text for modification; adjusting a region to be edited of the audio to be edited according to the duration of the audio corresponding to the text for modification, to obtain an adjusted audio to be edited; obtaining, based on a pre-trained audio editing model, an edited audio according to the adjusted audio to be edited and the modified text. In the present disclosure, the edited audio obtained by the audio editing model sounds natural in the context, and supports the function of synthesizing new words that do not appear in the corpus.

9 Claims, 6 Drawing Sheets

(56) References Cited

FOREIGN PATENT DOCUMENTS

| | | |
|---|---|---|
| CN | 111885313 A | 11/2020 |
| CN | 112863480 A | 5/2021 |
| CN | 113299269 A | 8/2021 |
| CN | 113345409 A | 9/2021 |
| CN | 113421547 A | 9/2021 |
| CN | 113450765 A | 9/2021 |

OTHER PUBLICATIONS

Tao et al.. Development and Challenge of Speech Forgery and Detection, Journal of Cyber Security, vol. 5, No. 2, pp. 28-38, dated Mar. 31, 2020.
Wang et al., Patnet: a Phoneme-Level Autoregressive Transformer Network for Speech Synthesis, ICASSP2021, pp. 5684-5688, dated May 13, 2021.

\* cited by examiner

METHOD AND APPARATUS FOR EDITING AUDIO, ELECTRONIC DEVICE AND STORAGE MEDIUM

CROSS-REFERENCE TO RELATED APPLICATIONS

The present disclosure claims priority to Chinese Patent Application 202111292710.2, entitled "Method and apparatus for editing audio, electronic device and storage medium", filed on Nov. 3, 2021, the entire content of which is incorporated herein by reference.

TECHNICAL FIELD

The present disclosure relates to a field of speech processing, in particular to a method and an apparatus for editing audio, an electronic device and a storage medium.

BACKGROUND OF THE INVENTION

The rapid development of the Internet has accelerated the dissemination of information. There are various media for learning, entertainment and communication, such as movies, videos, interactive online education and so on. The production of these media is often inseparable from audio content editing. A typical audio content editing interface displays visualization of speech, such as waveforms and/or spectrograms, and provides users with standard selecting, cutting, copying, pasting and volume adjustment, which are applied to the waveform itself, and also supports some advanced operations, such as time stretching, pitch bending and denoising. These tools provide great convenience for media producers and have a wide range of application scenarios.

Some systems allow editors to select, cut, and paste the text corresponding to the audio, and change the audio content accordingly, which is called text-based audio content editing. Traditional text-based audio content editing technology is inseparable from manual copying and pasting, which will lead to the discontinuity of modified fundamental frequency, and it is difficult to make a natural connection between synthesized speech and context, which will lead to a phenomenon that it sounds apparently unnatural. The bigger problem is that the above editing techniques do not support the ability to synthesize new words that do not appear in the transcribed text. For a person, it is easy to type a new word that does not appear in the corpus, but it is not easy to synthesize the corresponding pronunciation of the new word through the editor. Of course, new speech may be recorded, but it needs to access the original speaker, which makes the audio content editing process very difficult. With the rapid development of deep learning in speech generation tasks, machine-synthesized speech may be comparable to human beings. However, these tasks are to synthesize the corresponding speech for a given text, but may not edit specific words in the synthesis.

SUMMARY OF THE INVENTION

In order to solve the above technical problems or at least partially solve the above technical problems, the embodiments of the present disclosure provide a method and an apparatus for editing audio, an electronic device and a storage medium.

In a first aspect, embodiments of the present disclosure provide a method for editing audio, including steps of:

acquiring a modified text obtained by modifying a known original text of an audio to be edited according to a known text for modification;

predicting a duration of an audio corresponding to the text for modification;

adjusting a region to be edited of the audio to be edited according to the duration of the audio corresponding to the text for modification, to obtain an adjusted audio to be edited;

based on a pre-trained audio editing model, obtaining, an edited audio according to the adjusted audio to be edited and the modified text.

Preferably, acquiring the modified text obtained by modifying the known original text of the audio to be edited according to the known text for modification includes:

obtaining the modified text by adding the known text for modification to the known original text of the audio to be edited, and/or obtaining the modified text by replacing part of words in the original text of the audio to be edited with the known text for modification.

Preferably, predicting the duration of the audio corresponding to the text for modification is implemented by a pre-trained duration prediction model.

Preferably, the type of the text for modification comprises at least one of adding and replacing, adjusting the region to be edited of the audio to be edited according to the duration of the audio corresponding to the text for modification, to obtain the adjusted audio to be edited, includes:

adding a masked part at a designated position of the region to be edited, and ensuring that the masked part is consistent in the duration with the audio corresponding to the text for modification; and/or masking the audio corresponding to the text to be replaced in the region to be edited to obtain the masked part, and adding or deleting frames at the masked part to make the masked part consistent in the duration with the audio corresponding to the edited text;

regarding the audio to be edited which carries the masked part as the adjusted audio to be edited.

Preferably, based on the pre-trained audio editing model, obtaining the edited audio according to the adjusted audio to be edited and the modified text includes:

extracting acoustic features from the adjusted audio to be edited;

inputting the extracted acoustic features and the modified text into a pre-trained coarse decoder to obtain coarse acoustic features corresponding to a masked part of the extracted acoustic features;

inputting the coarse acoustic features and the acoustic features after masking into a pre-trained fine decoder to obtain fine acoustic features corresponding to the masked part;

integrating and then inputting the fine acoustic features with the extracted acoustic features into a vocoder to obtain the edited audio.

Preferably, the audio editing model is trained by steps of:

extracting the original acoustic features from the known audio;

masking part of the region of the original acoustic features to obtain the acoustic features after masking;

training a known neural network model by using the acoustic features after masking, the text of the audio and the original acoustic features to obtain the audio editing model.

Preferably, the neural network model comprises a coarse decoder and a fine decoder, training the known neural network model by using the acoustic features after masking, the text of the audio and the original acoustic features to obtain the audio editing model, includes:

inputting the acoustic features after masking and the text of the known audio into the coarse decoder to obtain the coarse acoustic features corresponding to the masked part of the acoustic features after masking;

inputting the coarse acoustic features and the acoustic features after masking into the fine decoder to obtain the fine acoustic features corresponding to the masked part;

comparing the fine acoustic features with the original acoustic features;

when the difference between the fine acoustic features and the original acoustic feature is less than or equal to a preset threshold value, the current series structure of the coarse decoder and the fine decoder is regarded as the audio editing model;

when the difference between the fine acoustic features and the original acoustic feature is more than the preset threshold value, the parameters of the current coarse decoder and the fine decoder are adjusted until the difference between the fine acoustic features and the original acoustic features is less than or equal to the preset threshold value.

Preferably, inputting the extracted acoustic features and the modified text into the pre-trained coarse decoder to obtain coarse acoustic features corresponding to the masked part of the extracted acoustic features is represented by the following expression, which includes:

$$P(y^{coarse}|x;\theta) = \prod_{t=1}^{T'} P(y_t|x, y^{mask};\theta)$$

wherein, $y^{coarse}$ represents a coarse acoustic feature, $y^{mask}$ represents the input acoustic features after masking, x represents the text information, $\theta$ represents the parameters that the model needs to learn, $y_t$ represents the acoustic parameters of the t-th frame.

Preferably, inputting the coarse acoustic features and the acoustic features after masking into the pre-trained fine decoder to obtain fine acoustic features corresponding to the masked part is represented by the following expression, which comprises:

$$P(y^{fine}|x;\theta) = \prod_{t=1}^{T'} P(y_t|y^{coarse} + y^{mask};\theta)$$

wherein, $y^{fine}$ represents a fine acoustic feature, $y^{coarse}$ represents a coarse acoustic feature, $y^{mask}$ represents the input acoustic features after masking, x represents the text information, $\theta$ represents the parameters that the model needs to learn, $y_t$ represents the acoustic parameters of the t-th frame.

In a second aspect, embodiments of the present disclosure provide an apparatus for editing audio, including steps of:

a modification module configured to acquire a modified text obtained by modifying a known original text of an audio to be edited according to a known text for modification;

a prediction module configured to predict the duration of an audio corresponding to the text for modification;

an adjustment module configured to adjust a region to be edited of the audio to be edited according to the duration of the audio corresponding to the text for modification, to obtain an adjusted audio to be edited;

an editing module configured to obtain, based on a pre-trained audio editing model, an edited audio according to the adjusted audio to be edited and the modified text.

In a third aspect, embodiments of the present disclosure provide an electronic device, including a processor, a communication interface, a memory, and a communication bus, where, the processor, the communication interface and the memory communicate with each other through the communication bus;

the memory is for storing computer programs, and the processor is for implementing steps of the method for editing audio according to the present disclosure when executing the programs stored on the memory.

In a fourth aspect, embodiments of the present disclosure provide a computer-readable storage medium with a computer program stored thereon, wherein the computer program, when executed by a processor, implements steps of the method for editing audio according to the present disclosure.

Compared with the prior art, the technical solution provided by the embodiments of the present disclosure has the following advantages:

The method provided by the embodiments of the present disclosure, acquiring a modified text obtained by modifying a known original text of an audio to be edited according to a known text for modification; predicting the duration of an audio corresponding to the text for modification; adjusting a region to be edited of the audio to be edited according to the duration of the audio corresponding to the text for modification, to obtain an adjusted audio to be edited; obtaining, based on a pre-trained audio editing model, an edited audio according to the adjusted audio to be edited and the modified text. In the present disclosure, the edited audio obtained by the audio editing model sounds natural in the context, and supports the function of synthesizing new words that do not appear in the corpus.

BRIEF DESCRIPTION OF THE DRAWINGS

The accompanying drawings herein, which are incorporated into the specification and constitute a part of the specification, show embodiments in accordance with the present disclosure and serve to explain the principle of the present disclosure together with the specification.

In order to describe the technical solutions more clearly in the embodiments of the present disclosure or the prior art, the accompanying drawings necessarily used for the description of the embodiments or related art will be briefly introduced in the following. It is obvious for those of ordinary skill in the art to obtain other accompanying drawings from these accompanying drawings without paying creative labor.

DETAILED DESCRIPTION OF THE EMBODIMENTS

In order to make the object, technical solution and advantages of the embodiments of the present disclosure clearer, the technical solution of the embodiments of the present disclosure will be clearly and completely described in conjunction with the accompanying drawings in the embodiments of the present disclosure, and it will be obvious that the described embodiments are part of the embodiments of the present disclosure, but not all of them. Based on the embodiments in the present disclosure, all other embodiments obtained by those of ordinary skill in the art without making creative efforts fall within the scope of protection of the present disclosure.

Figure 1:
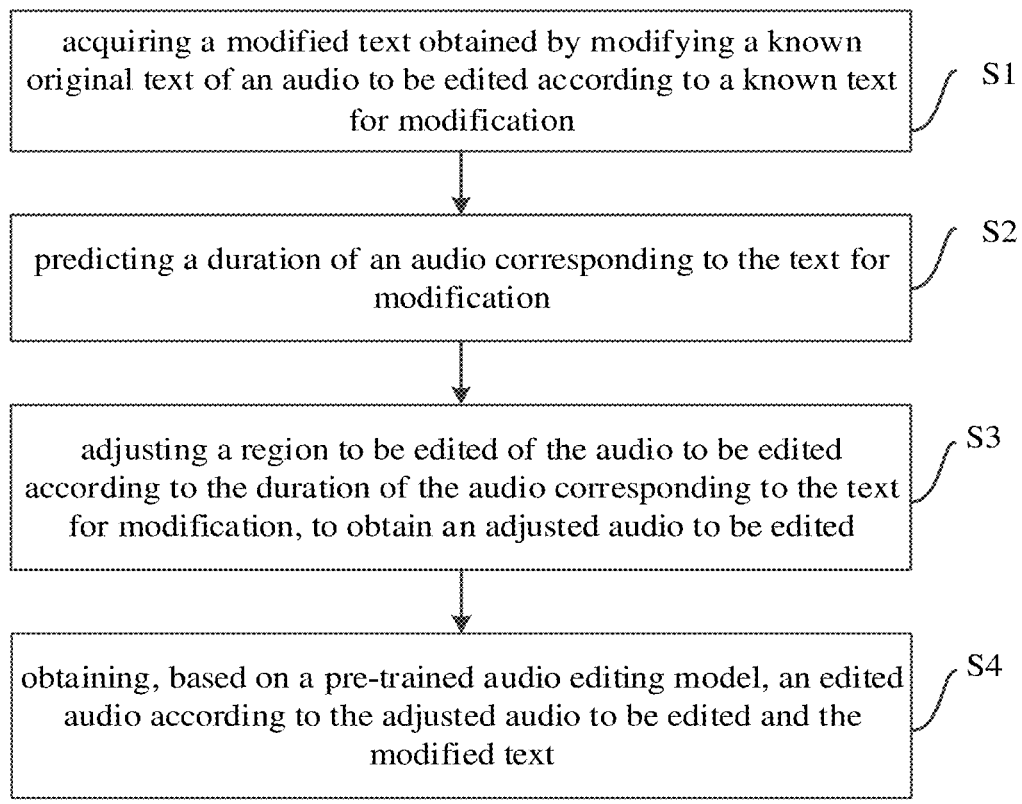
FIG. 1 schematically shows a flow diagram of a method for editing audio provided by an embodiment of the present disclosure.

FIG. 1 is a schematic flow chart of a method for editing audio according to an embodiment of the present disclosure. As shown in FIG. 1, the method for editing audio includes the following steps:

S1, acquiring a modified text obtained by modifying a known original text of an audio to be edited according to a known text for modification;

S2, predicting the duration of an audio corresponding to the text for modification;

In practical application scenarios, predicting duration of the audio corresponding to the text for modification may be implemented by a pre-trained duration prediction model. The duration prediction model is common in speech synthesis tasks, which may be implemented by using 3-layer fully connected layers.

S3, adjusting a region to be edited of the audio to be edited according to the duration of the audio corresponding to the text for modification, to obtain an adjusted audio to be edited;

S4, obtaining, based on a pre-trained audio editing model, an edited audio according to the adjusted audio to be edited and the modified text.

Figure 2:
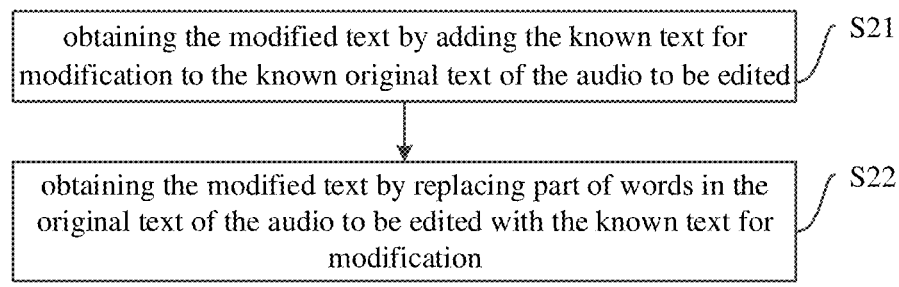
FIG. 2 schematically shows a flow diagram of a method for editing audio provided by an embodiment of the present disclosure.

As shown in FIG. 2, in Step S1, acquiring the modified text obtained by modifying the original text of the known audio to be edited according to the known text for modification, includes:

S21, the modified text may be obtained by adding the known text for modification to the known original text of the audio to be edited, and/or S22, the modified text may be obtained by replacing part of words in the original text of the audio to be edited with the known text for modification.

Figure 3:
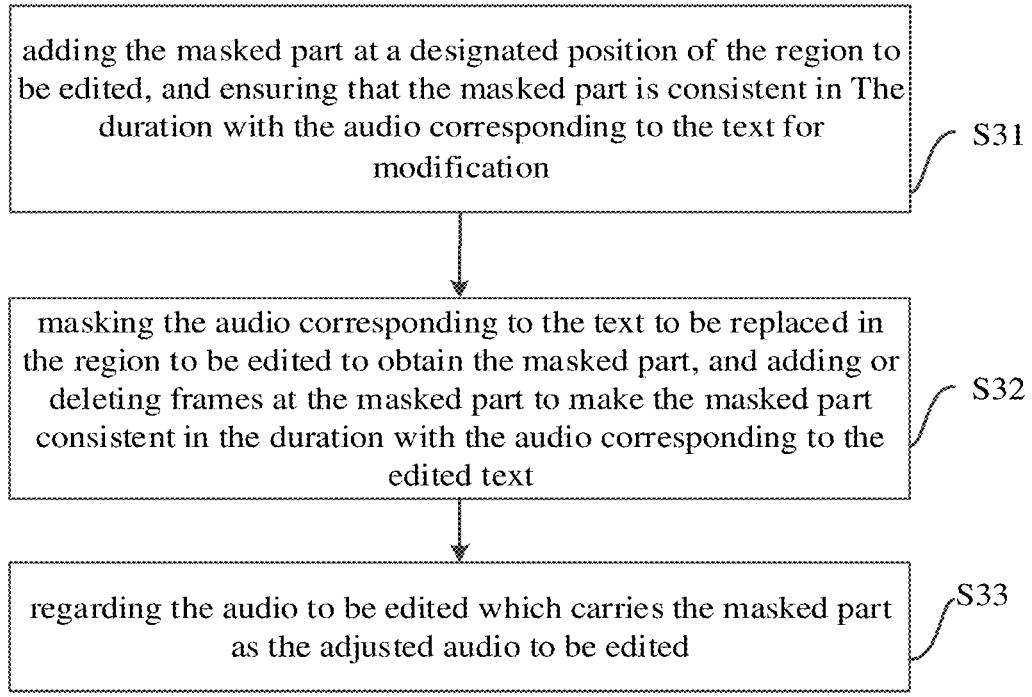
FIG. 3 schematically shows a flow diagram of a method for editing audio provided by another embodiment of the present disclosure.

As shown in FIG. 3, in Step S3, the type of the text for modification includes at least one of adding and replacing, adjusting the region to be edited of the audio to be edited according to the duration of the audio corresponding to the edited text, to obtain the adjusted audio to be edited, includes:

S31, adding a masked part at a designated position of the region to be edited, and ensuring that the masked part is consistent in the duration with the audio corresponding to the edited text; and/or S32, masking the audio corresponding to the text to be replaced in the region to be edited to obtain the masked part, and adding or deleting frames in the masked part to make the masked part consistent in the duration with the audio corresponding to the edited text;

S33, the audio to be edited which carries the masked part may be regarded as the adjusted audio to be edited.

In practical application, the step corresponding to step S31 may be adding the audio corresponding to the text for modification to the audio to be edited, and the step corresponding to step S32 may be replacing the audio corresponding to the text to be replaced with the audio corresponding to the text for modification, and fusing the replaced audio into the audio to be edited. It should be noted that the text for modification in step S31 and step S32 may be the same or different.

Further, step S32 includes the case in which the text to be replaced may be deleted, that is, replacing the text to be replaced with blank text, in which case the duration of the audio corresponding to the blank text is not 0 and may be a preset value.

Figure 4:
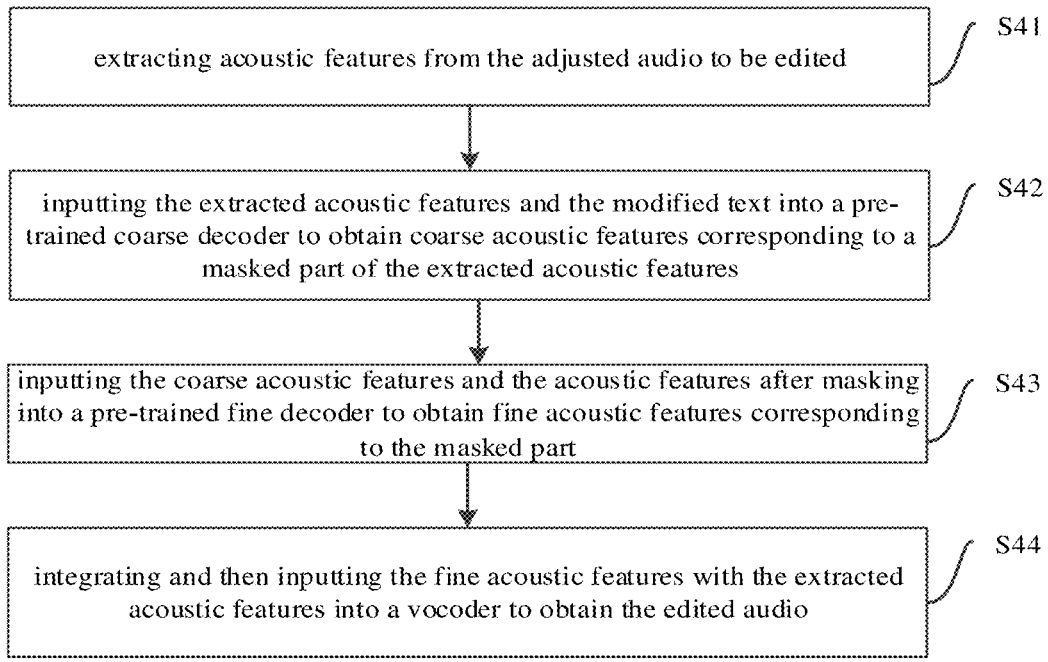
FIG. 4 schematically shows a flow diagram of a method for editing audio provided by another embodiment of the present disclosure.

As shown in FIG. 4, in Step S4, based on the pre-trained audio editing model, obtaining the edited audio according to the adjusted audio to be edited and the modified text, includes:

S41, extracting acoustic features from the adjusted audio to be edited;

S42, inputting the extracted acoustic features and the modified text into a pre-trained coarse decoder to obtain coarse acoustic features corresponding to a masked part of the extracted acoustic features;

S43, inputting the coarse acoustic features and the acoustic features after masking into a pre-trained fine decoder to obtain fine acoustic features corresponding to the masked part;

S44, integrating the fine acoustic features with the extracted acoustic features and then inputting them into a vocoder to obtain the edited audio.

Figure 5:
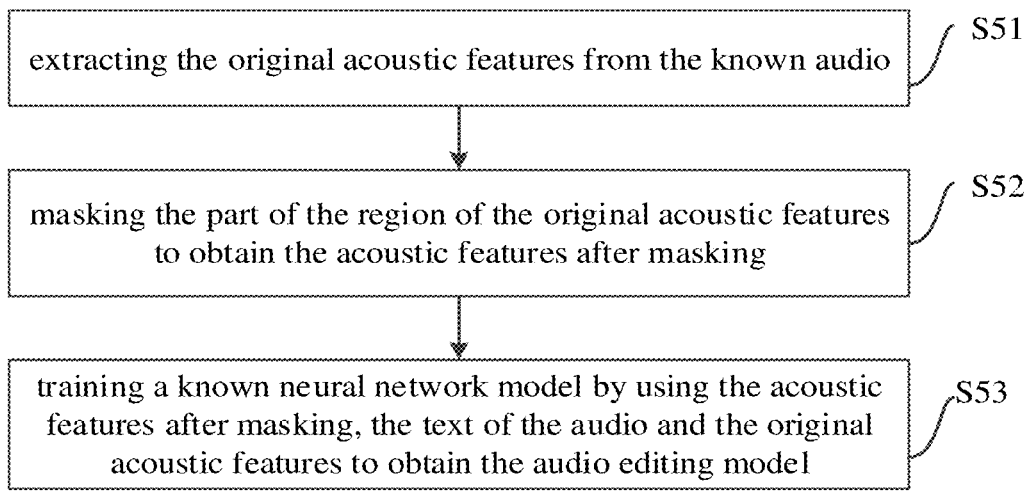
FIG. 5 schematically shows a flow diagram of a method for editing audio provided by another embodiment of the present disclosure.

As shown in FIG. 5, in Step S4, the audio editing model may be trained by the following steps:

S51, extracting the original acoustic features from the known audio;

S52, masking part of the region of the original acoustic features to obtain the acoustic features after masking;

S53, training the known neural network model by using the acoustic features after masking, the text of the audio and the original acoustic features to obtain the audio editing model.

Figure 6:
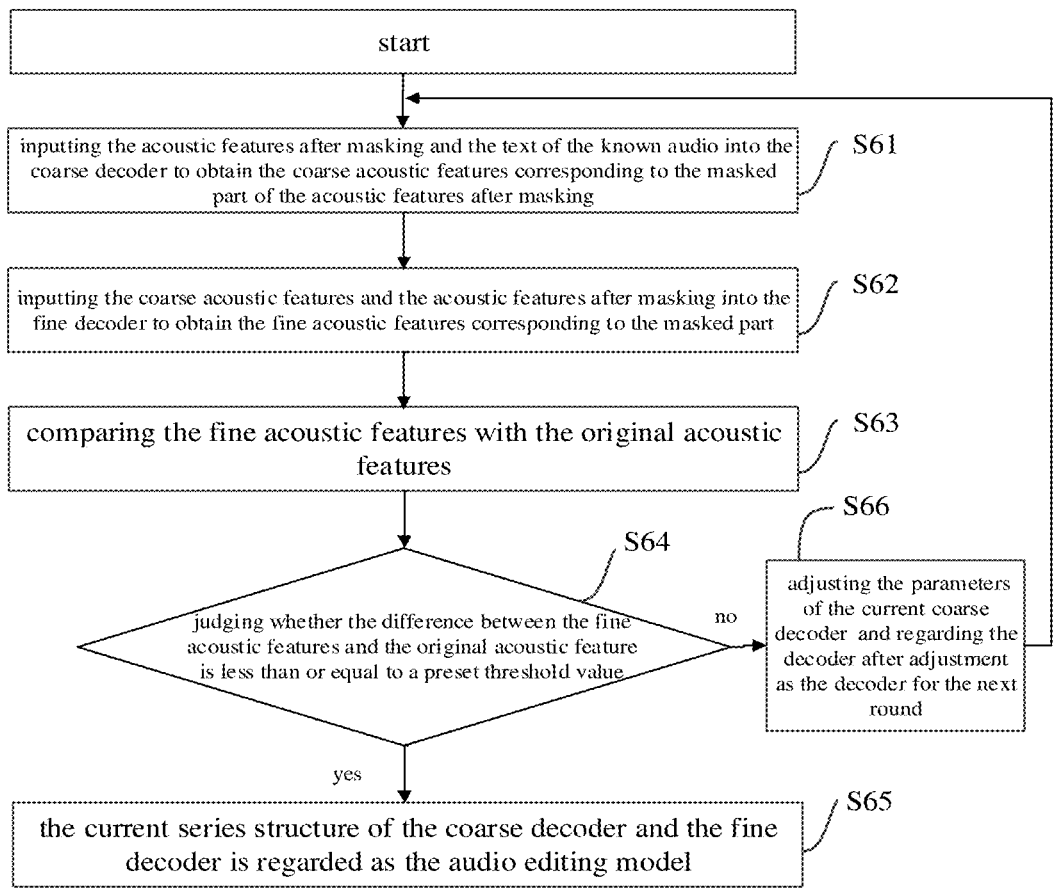
FIG. 6 schematically shows a flow diagram of a method for editing audio provided by another embodiment of the present disclosure.

As shown in FIG. 6, in Step S53, the neural network model includes a coarse decoder and a fine decoder. Training the known neural network model by using the acoustic features after masking, the text of the audio and the original acoustic features to obtain the audio editing model, includes:

S61, inputting the acoustic features after masking and the text of the known audio into the coarse decoder to obtain the coarse acoustic features corresponding to the masked part of the acoustic features after masking;

S62, inputting the coarse acoustic features and the acoustic features after masking into the fine decoder to obtain the fine acoustic features corresponding to the masked part;

S63, comparing the fine acoustic features with the original acoustic features;

S64, judging whether the difference between the fine acoustic features and the original acoustic feature is less than or equal to a preset threshold value:

If yes, step S65 may be executed;

If not, step S66 may be executed;

In S65, the current series structure of the coarse decoder and the fine decoder is regarded as the audio editing model;

In S66, the parameters of the current coarse decoder and the fine decoder are adjusted until the difference between the fine acoustic features and the original acoustic features is less than or equal to a preset threshold value.

Figure 7:
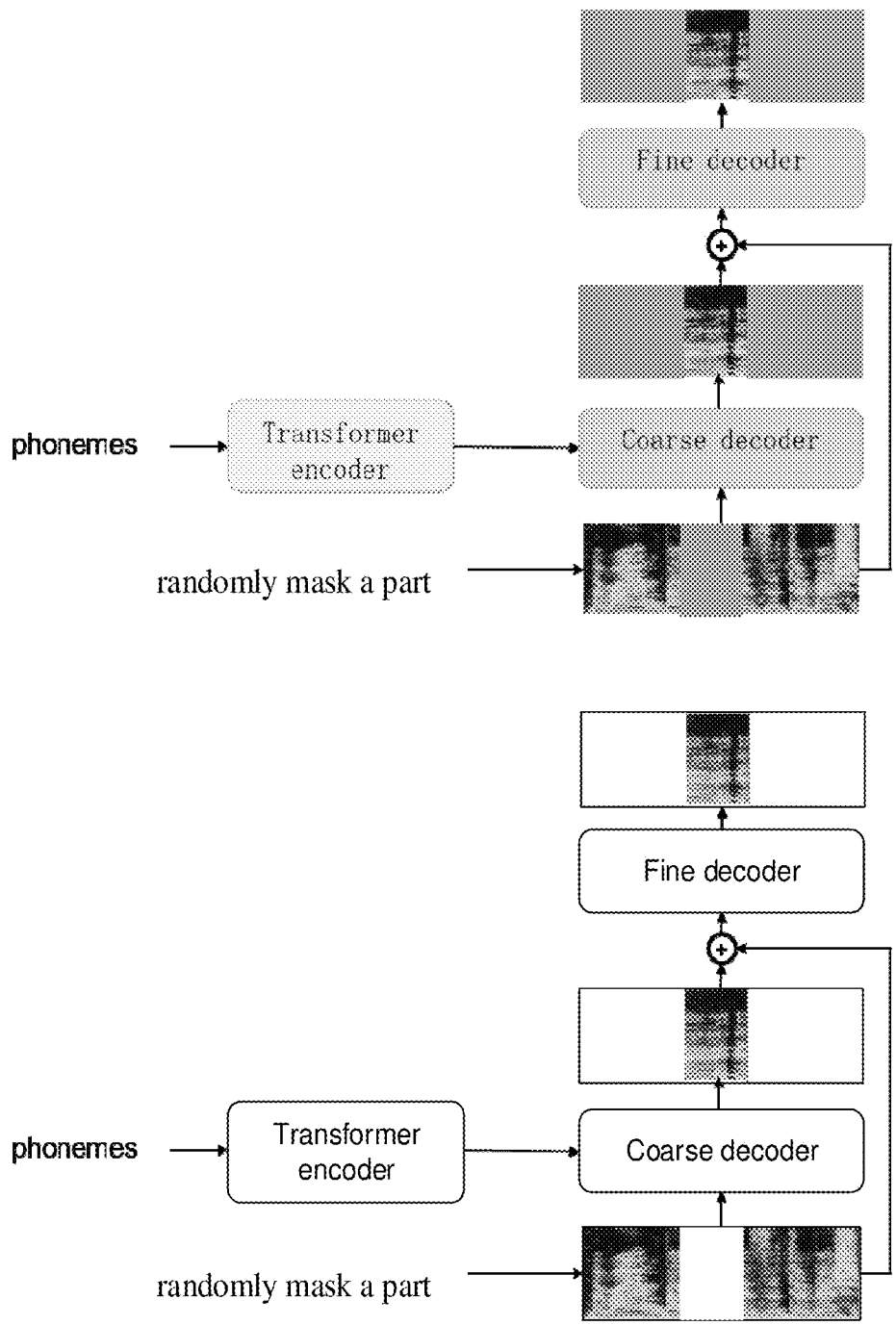
FIG. 7 schematically shows a schematic diagram of a model training flow provided by an embodiment of the present disclosure.

In practical application, as shown in FIG. 7, the model training stage needs three modules, namely an encoder, a coarse decoder and a fine decoder. Among them, phonemes represent a speech unit, the Transformer encoder may be an encoder in Transformer structure, the Coarse decoder may be a coarse decoder, and the fine decoder may be a fine decoder. The model training stage consists of the following two processing stages: encoder and decoder. Firstly, the encoder module processes the input sentence and converts it into a hidden representation, where the hidden representation will be used to guide the decoder to predict the acoustic features of the edited speech. Secondly, in the decoding stage, a part of continuous acoustic features in the input speech may be randomly masked, and the masking length may occupy about 15% of the total speech length. Then, by means of a multi-head attention mechanism, the alignment information between the acoustic features after masking and the text representation may be learned, and the coarse acoustic features are predicted. Then, the fine decoder predicts finer acoustic features based on the coarse acoustic features, and further fuses the context information of speech to make the predicted speech more natural. Here, the whole process of masking the acoustic features and predicting the masking part may be called a context-aware based mask re-prediction process.

In order to better perceive the context information in the speech and make the predicted speech more natural, the structure of the two-stage transformer in which the decoders are connected in series according to embodiments of the present disclosure has implemented the decoding method from coarse to fine. Firstly, text information and masked speech are used to predict a coarse acoustic feature. In the first decoding stage, the masked true value and the encoded text information are input into the coarse decoder, where the coarse decoder will combine the two information to output coarse acoustic features. The coarse acoustic features already contain approximate audio content, but lack detailed content, and the sound quality is not too high. The procedure thereof may be represented by the following expression:

$$P(y^{coarse}|x;\theta) = \prod_{t=1}^{T'} P(y_t|x, y^{mask};\theta)$$

Among them, $y^{coarse}$ represents a coarse acoustic feature, $y^{mask}$ represents the input acoustic features after masking, x represents the text information, $\theta$ represents the parameters that the model needs to learn, $y_t$ represents the acoustic parameters of the t-th frame.

Then, the second stage is to transfer the coarse acoustic features and the text features passed through the encoder to the fine decoder. At this time, due to the input of the fine decoder, that is, the coarse acoustic features already contain the approximate audio content, the fine decoder only needs to fill in the details. The procedure thereof may be represented by the following expression:

$$P(y^{fine}|x;\theta) = \prod_{t=1}^{T'} P(y_t|y^{coarse} + y^{mask};\theta)$$

Among them, $y^{fine}$ represents a fine acoustic feature, $y^{coarse}$ represents a coarse acoustic feature, $y^{mask}$ represents the input acoustic features after masking, x represents the text information, $\theta$ represents the parameters that the model needs to learn, $y^t$ represents the acoustic parameters of the t-th frame.

As shown in FIG. 7, the encoder and the fine decoder sections both adopt a 3-layer transformer structure, with a hidden layer dimension of 256. Coarse Decoder adopts a 3-layer transformer structure based on multi-head attention mechanism. Compared with encoder and fine decoder, this structure may learn the alignment information of text sequence and audio sequence, and the hidden layer dimension may be 256. The speech and its corresponding text may be used as input in the training data.

In practical application, using the trained model, operations such as text-based replacement and insertion may be performed on the content of the speech.

The replacement operation allows the user to replace one speech with another speech. First, mask the speech to be replaced according to the word boundary, and then modify the text. Then, the time length of the new word to replace with may be obtained by the duration prediction model, and then some frames are added or deleted in the masked region of the masked speech, so that the time length of the masked region may be consistent with the time length of the new words. The second step is to input the masked speech and modified text into the model. The model will predict the speech after replacement according to the modified text.

The inserting operation allows the user to insert speech into the edited speech. This operation may be similar to the replacing operation. First, a pre-trained time prediction model may be used to predict the duration of inserting new words, and then insert a mask signal with the same time length as that of the new words into the speech. The modified text and the speech inserted with mask signal are then input into a model, and the model will predict the speech of the inserted mask signal based on the modified text.

The embodiment of the present disclosure may implement the function of modifying the text content corresponding to the original audio by deleting, inserting and replacing operations in the text-based audio content editing to change the content of the audio content, for example, replacing a word with wrong pronunciation in the speech, or inserting some emphasis words to enhance some semantics of the speech, etc.

Embodiments of the present disclosure may avoid unnatural phenomena caused by copying and pasting in traditional audio content tampering, and may synthesize speech that is not in the corpus.

The embodiment of the present disclosure may fully cover various situations that text-based audio content tampering may face.

Figure 8:
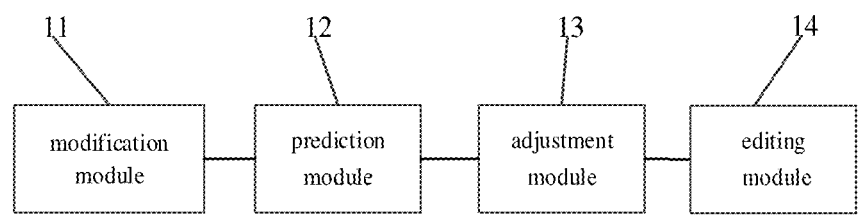
FIG. 8 schematically shows a work flow diagram of a voice control device provided by another embodiment of the present disclosure.

Based on the same inventive concept, as shown in FIG. 8, an embodiment of the present disclosure provides an apparatus for editing audio, and the apparatus includes: a modification module 11, a prediction module 12, an adjustment module 13, and an editing module 14.

In this embodiment, the modification module 11 may be configured to acquire a modified text obtained by modifying a known original text of an audio to be edited according to a known text for modification;

In this embodiment, the prediction module 12 may be configured to predict the duration of an audio corresponding to the text for modification;

In this embodiment, the adjustment module 13 may be configured to adjusting a region to be edited of the audio to be edited according to the duration of the audio corresponding to the text for modification, to obtain an adjusted audio to be edited;

In this embodiment, the editing module 14 may be configured to obtain, based on a pre-trained audio editing model, an edited audio according to the adjusted audio to be edited and the modified text.

In some embodiments, the modification module 11 may be further configured to:

obtain the modified text by adding the known text for modification to the known original text of the audio to be edited, and/or obtain the modified text by replacing part of words in the original text of the audio to be edited with the known text for modification.

In some embodiments, in the prediction module 12, predicting the duration of the audio corresponding to the text for modification may be implemented by a pre-trained duration prediction model.

In some embodiments, the adjustment module 13 may be further configured to:

adding a masked part at a designated position of the region to be edited, and ensuring that the masked part is consistent in the duration with the audio corresponding to the text for modification; and/or masking the audio corresponding to the text to be replaced in the region to be edited to obtain the masked part, and adding or deleting frames in the masked part to make the masked part consistent in the duration with the audio corresponding to the edited text, and the audio to be edited which carries the masked part may be regarded as the adjusted audio to be edited.

In some embodiments, the editing module 14 may be further configured to:

extract acoustic features from the adjusted audio to be edited;

input the extracted acoustic features and the modified text into a pre-trained coarse decoder to obtain coarse acoustic features corresponding to a masked part of the extracted acoustic features;

input the coarse acoustic features and the acoustic features after masking into a pre-trained fine decoder to obtain fine acoustic features corresponding to the masked part;

integrate and then input the fine acoustic features with the extracted acoustic features into a vocoder to obtain the edited audio.

In some embodiments, in the editing module 14, the audio editing model may be trained by the following steps:

extracting the original acoustic features from the known audio;

masking part of the region of the original acoustic features to obtain the acoustic features after masking;

training the known neural network model by using the acoustic features after masking, the text of the audio and the original acoustic features to obtain the audio editing model.

In some embodiments, in the editing module 14, the neural network model includes a coarse decoder and a fine decoder, training the known neural network model by using the acoustic features after masking, the text of the audio and the original acoustic features to obtain the audio editing model, includes:

inputting the acoustic features after masking and the text of the known audio into the coarse decoder to obtain the coarse acoustic features corresponding to the masked part of the acoustic features after masking;

inputting the coarse acoustic features and the acoustic features after masking into the fine decoder to obtain the fine acoustic features corresponding to the masked part;

comparing the fine acoustic features with the original acoustic features;

when the difference between the fine acoustic features and the original acoustic feature is less than or equal to a preset threshold value, the current series structure of the coarse decoder and the fine decoder may be regarded as the audio editing model;

when the difference between the fine acoustic features and the original acoustic feature is more than a preset threshold value, the parameters of the current coarse decoder and the fine decoder are adjusted until the difference between the fine acoustic features and the original acoustic features is less than or equal to a preset threshold value.

For the specific process of the implementation process of the functions and effect of each unit in the above-mentioned apparatus, please refer to the implementation process of the corresponding steps in the above method, which will not be repeated here.

For the embodiments of the device, since it substantially corresponds to the embodiments of the method, reference may be made to the partial description of the embodiment of the method for reference.

The apparatus embodiments described above are merely schematic, wherein the units illustrated as separate components may or may not be physically separated, and the components displayed as units may or may not be physical units, i.e. may be located in one place, or may be distributed over a plurality of network elements.

Part or all of the modules may be selected according to the actual needs to achieve the purpose of the application.

Those of ordinary skill in the art will be able to understand and practice without creative effort.

Figure 9:
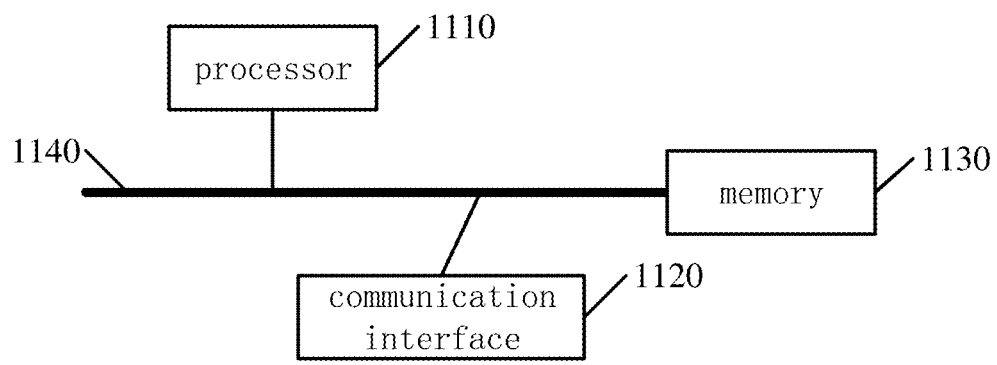
FIG. 9 schematically shows a structural diagram of an electronic device provided by another embodiment of the present disclosure.

Based on the same inventive concept, as shown in FIG. 9, the embodiment of the present disclosure provides an electronic device including a processor 1110, a communication interface 1120, a memory 1130 and a communication bus 1140, wherein, the processor 1110, the communication interface 1120 and the memory 1130 communicate with each other through the communication bus 1140;

The memory 1130 may be used to store computer programs.

The processor 1110 implements a method for editing audio as follows when executing a program stored on the memory 1130:

acquiring a modified text obtained by modifying a known original text of an audio to be edited according to a known text for modification;

predicting the duration of an audio corresponding to the text for modification;

adjusting a region to be edited of the audio to be edited according to the duration of the audio corresponding to the text for modification, to obtain an adjusted audio to be edited;

obtaining, based on a pre-trained audio editing model, an edited audio according to the adjusted audio to be edited and the modified text.

The communication bus 1140 may be a Peripheral Component Interconnect (PCI) bus or an Extended Industry Standard Architecture (EISA) bus or the like. The communication bus 1140 may be divided into an address bus, a data bus, a control bus and the like. For ease of presentation, only one thick line is used in the figure, but it does not mean that there is only one bus or one type of bus.

The communication interface 1120 may be used for communication between the above-mentioned electronic device and other devices.

The memory 1130 may include a Random Access Memory (RAM) or a non-volatile memory, for example, at least one disk memory. Alternatively, the memory 1130 may also be at least one storage device located remotely from the processor 1110.

The processor 1110 may be a general-purpose processor, including a Central Processing Unit (CPU), a Network Processor (NP), and the like; It may also be Digital Signal Processing (DSP), Application Specific Integrated Circuit (ASIC), Field-Programmable Gate Array (FPGA) or other programmable logic devices, discrete gates or transistor logic devices, and discrete hardware components.

Based on the same inventive concept, embodiments of the present disclosure provide a computer-readable storage medium storing one or more programs executable by one or more processors to implement a method for editing audio in any of the above possible implementations.

Alternatively, the storage medium may be a non-temporary computer-readable storage medium, for example, the non-temporary computer-readable storage medium may be a ROM, a random access memory (RAM), a CD-ROM, a magnetic tape, a floppy disk, an optical data storage device, and the like.

Based on the same inventive concept, embodiments of the present disclosure also provide a computer-readable storage medium including a computer program that, when executed by a processor, implements a method for editing audio in any of the above possible implementations.

In the above-mentioned embodiments it may be implemented in whole or in part by software, hardware, firmware or any combination thereof. When implemented in software, it may be implemented in whole or in part in the form of a computer program product. A computer program product includes one or more computer instructions. When computer program instructions are loaded and executed on a computer, the flow or function according to embodiments of the present disclosure may be generated in whole or in part. The computer may be a general computer, a special computer, a computer network, or other programmable device. The computer instructions may be stored in a computer-readable storage medium, or transmitted from one computer-readable storage medium to another computer-readable storage medium, for example, computer instructions may be transmitted from one web site, computer, server, or data center to another web site, computer, server, or data center in a wired manner (e.g., coaxial cable, optical fiber, digital subscriber line (DSL)) or wireless manner (e.g., infrared, wireless, microwave, etc.). A computer-readable storage medium may be any available medium that a computer may access or a data storage device such as a server, data center, etc. containing one or more available media integration. Available media may be magnetic media (e.g., floppy disk, hard disk, magnetic tape), optical media (e.g., DVD), or semiconductor media (e.g., Solid State Disk (SSD)), etc.

Finally, it should be noted that the above embodiments are only used to illustrate the technical scheme of the present disclosure, not to limit it; Although the present disclosure has been described in detail with reference to the foregoing embodiments, it should be understood by those of ordinary skill in the art that the technical scheme described in the foregoing embodiments may still be modified or some technical features thereof may be equivalently substituted; these modifications or substitutions do not depart the essence of the corresponding technical proposal from the spirit and scope of the technical proposal of the embodiments of the present disclosure.

What is claimed is:

1. A method for editing audio, comprising:

acquiring a modified text obtained by modifying a known original text of an audio to be edited according to a known text for modification;

predicting a duration of an audio corresponding to the text for modification;

adjusting a region to be edited of the audio to be edited according to the duration of the audio corresponding to the text for modification, to obtain an adjusted audio to be edited;

obtaining, based on a pre-trained audio editing model, an edited audio according to the adjusted audio to be edited and the modified text, wherein the obtaining, based on the pre-trained audio editing model, the edited audio according to the adjusted audio to be edited and the modified text comprises:

extracting acoustic features from the adjusted audio to be edited;

inputting the extracted acoustic features and the modified text into a pre-trained coarse decoder to obtain coarse acoustic features corresponding to a masked part of the extracted acoustic features;

inputting the coarse acoustic features and the acoustic features after masking into a pre-trained fine decoder to obtain fine acoustic features corresponding to the masked part;

integrating and then inputting the fine acoustic features with the extracted acoustic features into a vocoder to obtain the edited audio, wherein, extracting the original acoustic features from the known audio; masking a part of the region of the original acoustic features to obtain the acoustic features after masking, wherein, inputting the extracted acoustic features and the modified text into the pre-trained coarse decoder to obtain coarse acoustic features corresponding to the masked part of the extracted acoustic features is represented by the following expression, which comprises:

$$P(y^{coarse}|x;\theta) = \prod_{t=1}^{T'} P(y_t|x, y^{mask};\theta)$$

wherein, $y^{coarse}$ represents the coarse acoustic feature, $y^{mask}$ represents the input acoustic features after masking, x represents text information, θ represents parameters that the audio editing model needs to learn, $y_t$ represents acoustic parameters of the t-th frame, inputting the coarse acoustic features and the acoustic features after masking into the pre-trained fine decoder to obtain the fine acoustic features corresponding to the masked part is represented by the following expression, which comprises:

$$P(y^{fine}|x;\theta) = \prod_{t=1}^{T'} P(y_t|y^{coarse} + y^{mask};\theta)$$

wherein, $y^{fine}$ represents the fine acoustic feature, $y^{coarse}$ represents the coarse acoustic feature, $y^{mask}$ represents the input acoustic features after masking, x represents the text information, θ represents the parameters that the audio editing model needs to learn, $y_t$ represents the acoustic parameters of the t-th frame.

2. The method according to claim 1, wherein the acquiring the modified text obtained by modifying the known original text of the audio to be edited according to the known text for modification comprises:
   obtaining the modified text by adding the known text for modification to the known original text of the audio to be edited; and/or
   obtaining the modified text by replacing part of words in the original text of the audio to be edited with the known text for modification.

3. The method according to claim 1, wherein, the predicting the duration of the audio corresponding to the text for modification is implemented by a pre-trained duration prediction model.

4. The method according to claim 1, wherein, a type of the text for modification comprises at least one of adding and replacing, adjusting the region to be edited of the audio to be edited according to the duration of the audio corresponding to the text for modification, to obtain the adjusted audio to be edited comprises:
   adding the masked part at a designated position of the region to be edited, and ensuring that the masked part is consistent in the duration with the audio corresponding to the text for modification; and/or
   masking the audio corresponding to the text to be replaced in the region to be edited to obtain the masked part, and adding or deleting frames at the masked part to make the masked part consistent in the duration with the audio corresponding to the edited text;
   regarding the audio to be edited which carries the masked part as the adjusted audio to be edited.

5. The method according to claim 1, wherein, the audio editing model is trained by steps of:
   extracting the original acoustic features from the known audio;
   masking the part of the region of the original acoustic features to obtain the acoustic features after masking; and
   training a known neural network model by using the acoustic features after masking, the text of the audio and the original acoustic features to obtain the audio editing model.

6. The method according to claim 5, wherein, the neural network model comprises a coarse decoder and a fine decoder, the training the known neural network model by using the acoustic features after masking, the text of the audio and the original acoustic features to obtain the audio editing model comprises:
   inputting the acoustic features after masking and the text of the known audio into the coarse decoder to obtain the coarse acoustic features corresponding to the masked part of the acoustic features after masking;
   inputting the coarse acoustic features and the acoustic features after masking into the fine decoder to obtain the fine acoustic features corresponding to the masked part;
   comparing the fine acoustic features with the original acoustic features;
   when a difference between the fine acoustic features and the original acoustic feature is less than or equal to a preset threshold value, a current series structure of the coarse decoder and the fine decoder is regarded as the audio editing model; and
   when the difference between the fine acoustic features and the original acoustic feature is more than the preset threshold value, the parameters of the current coarse decoder and the fine decoder are adjusted until the difference between the fine acoustic features and the original acoustic features is less than or equal to the preset threshold value.

7. An apparatus for editing audio, comprising:
   a modification module, configured to acquire a modified text obtained by modifying a known original text of an audio to be edited according to a known text for modification;
   a prediction module, configured to predict duration of an audio corresponding to the text for modification;
   an adjustment module, configured to adjust a region to be edited of the audio to be edited according to the duration of the audio corresponding to the text for modification, to obtain an adjusted audio to be edited; and
   an editing module, configured to obtain, based on a pre-trained audio editing model, an edited audio according to the adjusted audio to be edited and the modified text,
   wherein the obtaining, based on a pre-trained audio editing model, an edited audio according to the adjusted audio to be edited and the modified text comprises:
   extracting acoustic features from the adjusted audio to be edited;
   inputting the extracted acoustic features and the modified text into a pre-trained coarse decoder to obtain coarse acoustic features corresponding to a masked part of the extracted acoustic features;
   inputting the coarse acoustic features and the acoustic features after masking into a pre-trained fine decoder to obtain fine acoustic features corresponding to the masked part;
   integrating and then inputting the fine acoustic features with the extracted acoustic features into a vocoder to obtain the edited audio,
   wherein, extracting the original acoustic features from the known audio; masking part of the region of the original acoustic features to obtain the acoustic features after masking,
   wherein, inputting the extracted acoustic features and the modified text into a pre-trained coarse decoder to obtain coarse acoustic features corresponding to the masked part of the extracted acoustic features is represented by the following expression, which comprises:

$$P(y^{coarse}|x;\theta) = \prod_{t=1}^{T'} P(y_t|x, y^{mask};\theta)$$

wherein, $y^{coarse}$ represents the coarse acoustic feature, $y^{mask}$ represents the input acoustic features after masking, x represents text information, θ represents parameters that the audio editing model needs to learn, $y_t$ represents acoustic parameters of the t-th frame, inputting the coarse acoustic features and the acoustic features after masking into a pre-trained fine decoder to obtain the fine acoustic features corresponding to the masked part is represented by the following expression, which comprises:

$$P(y^{fine}|x;\theta) = \prod_{t=1}^{T'} P(y_t|y^{coarse} + y^{mask};\theta)$$

wherein, $y^{fine}$ represents the fine acoustic feature, $y^{coarse}$ represents the coarse acoustic feature, $y^{mask}$ represents the input acoustic features after masking, x represents the text information, θ represents the parameters that the audio editing model needs to learn, $y_t$ represents the acoustic parameters of the t-th frame.

8. An electronic device, comprising a processor, a communication interface, a memory, and a communication bus, wherein the processor, the communication interface and the memory communicate with each other through the communication bus;
  the memory is for storing computer programs, and
  the processor is for implementing steps of the method for editing audio according to claim 1 when executing the programs stored on the memory.

9. A non-transitory computer-readable storage medium with a computer program stored thereon, wherein the computer program, when executed by a processor, implements steps of the method for editing audio according to claim 1.

\* \* \* \* \*